(12) United States Patent
Patel et al.

(10) Patent No.: US 12,217,225 B2
(45) Date of Patent: Feb. 4, 2025

(54) SYSTEM AND METHOD FOR SMART DEVICE COMMUNICATION AND TRANSACTION PROCESSING

(71) Applicant: PayPal, Inc., San Jose, CA (US)

(72) Inventors: Jay Patel, Round Rock, TX (US); Dielli Hoxha, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 228 days.

(21) Appl. No.: 16/728,959

(22) Filed: Dec. 27, 2019

(65) Prior Publication Data

US 2021/0201275 A1 Jul. 1, 2021

(51) Int. Cl.
*G06Q 20/08* (2012.01)
*G06Q 20/10* (2012.01)
*G06Q 20/32* (2012.01)
*G06Q 20/40* (2012.01)

(52) U.S. Cl.
CPC ....... *G06Q 20/0855* (2013.01); *G06Q 20/102* (2013.01); *G06Q 20/3221* (2013.01); *G06Q 20/3276* (2013.01); *G06Q 20/4014* (2013.01)

(58) Field of Classification Search
None
See application file for complete search history.

(56) References Cited

U.S. PATENT DOCUMENTS 9,002,739 B2 * 4/2015 Shin ..................... G06Q 20/306
   705/35
9,262,781 B2 * 2/2016 MacKinnon Keith .....................
   G06Q 20/20
2014/0007211 A1 * 1/2014 Yang ....................... H04L 63/18
   726/7
2014/0136443 A1 * 5/2014 Kinsey, II .......... G06Q 30/0631
   705/347
2016/0012465 A1 * 1/2016 Sharp ................... G06Q 20/321
   705/14.17
2018/0181944 A1 * 6/2018 Tilahun ............... G06Q 20/321
2018/0189841 A1 * 7/2018 Lee .................... G06Q 30/0271
2018/0225741 A1 * 8/2018 Moghadam ........ G06Q 30/0633
2018/0253805 A1 * 9/2018 Kelly .................... G06Q 20/322
2018/0343477 A1 * 11/2018 Loheide ............. H04N 21/2387
2020/0195695 A1 * 6/2020 Dagdeviren ............ H04M 3/42
2020/0349543 A1 * 11/2020 Gilbert .................. G06Q 50/26

FOREIGN PATENT DOCUMENTS

KR   20130004755 A  * 1/2013  ........ G06Q 20/3276
WO   WO-2015148693 A1 * 10/2015  ........ G06F 16/2358
WO   WO-2018111858 A1 * 6/2018  ............ G06F 21/44

OTHER PUBLICATIONS

Yang, S., "Video Streaming on Collaborated Mobile Devices over Wireless Mesh Networks", ProQuest Dissertations & Theses. (2012) (Year: 2012).*

* cited by examiner

*Primary Examiner* — Clay C Lee
(74) *Attorney, Agent, or Firm* — Haynes and Boone, LLP

(57) ABSTRACT

Aspects of the present disclosure involve systems, methods, devices, and the like for transaction processing using a smart device. In one embodiment, a system and method are introduced which enable the use of a third-party provider in conjunction with the smart device. The third-party provider can enable transaction processing and offloading, eliminating the need for processing via an application server. In another embodiment, a dynamic machine-readable code is further introduced for providing the communication between the third-party provider and the smart device.

20 Claims, 6 Drawing Sheets

SYSTEM AND METHOD FOR SMART DEVICE COMMUNICATION AND TRANSACTION PROCESSING

TECHNICAL FIELD

The present disclosure generally relates to smart device communication and in particular to a system enabling smart device communication for transaction processing.

BACKGROUND

In the advent of technology, industry has moved to the use of electronic devices and communications for processing transactions. As such, users are placing heavy reliance on the use of such devices for payment processing, item purchases, service requests, online browsing, money transfers, and the like. Additionally, users are now relying on electronics for use in conjunction with other smart devices for managing events, ordering items, and even streaming information. For example, users are now using smart devices to stream videos, movies, and the like. Unfortunately, streaming can be quite cumbersome and time consuming as the user is often required to enter a URL, download an application, register accounts, and add a payment method as well. Similarly, other interactions with smart devices often require such interaction from the user. As such, it would be beneficial to create a system and method for smart device communication and transaction that minimizes user and system friction.

Figure 1:
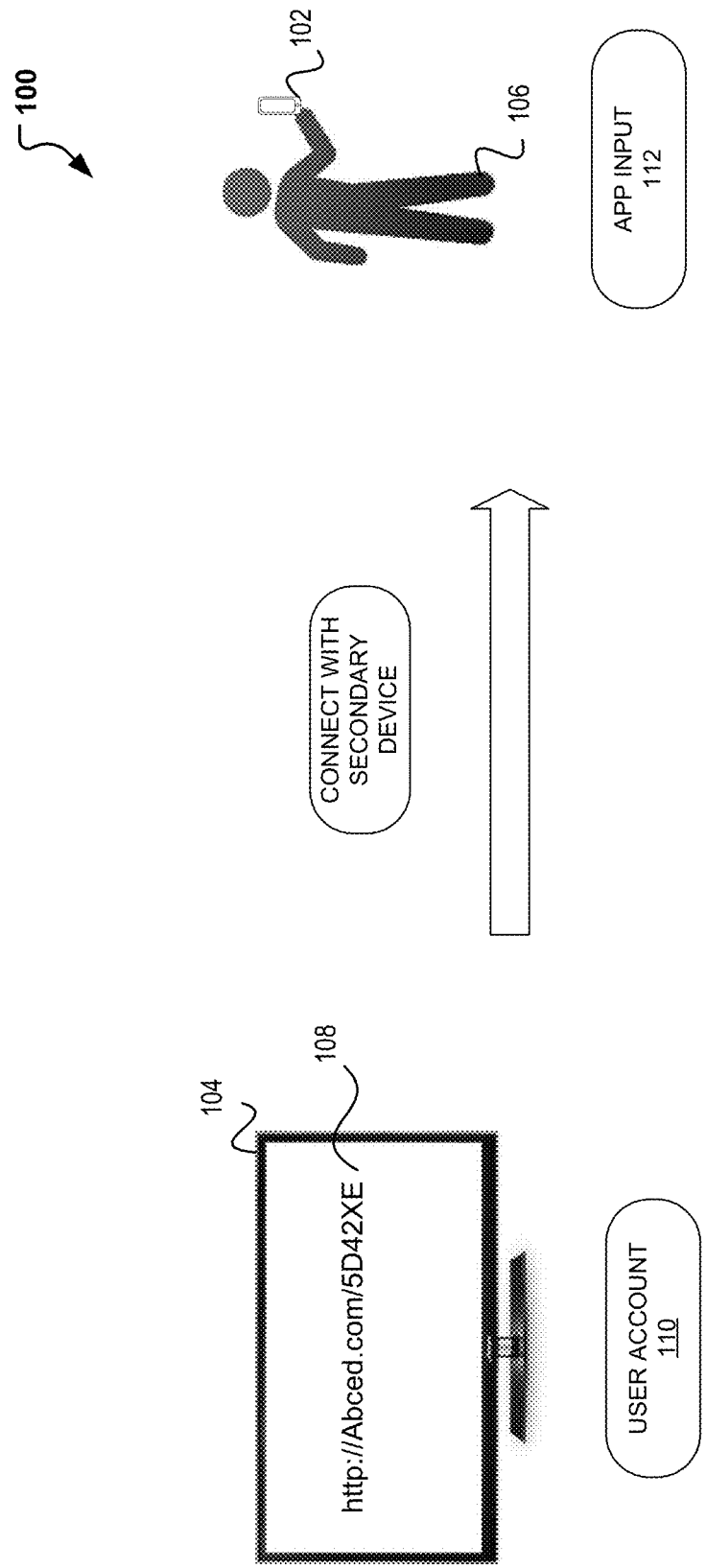
FIG. 1 illustrates exemplary diagrams of user transacting with a smart device.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for transaction processing using a smart device. In one embodiment, a system and method are introduced which enable the use of a third-party provider in conjunction with the smart device. The third-party provider can enable transaction processing and offloading, eliminating the need for processing via an application server. In another embodiment, a dynamic machine-readable code is further introduced for providing the communication between the third-party provider and the smart device. Software development kits are further used for the processing.

In the advent of technology, industry has moved to the use of electronic devices and communications for processing transactions. As such, users are placing heavy reliance on the use of such devices for payment processing, item purchases, service requests, online browsing, money transfers, and the like. Additionally, users are now relying on electronics for use in conjunction with other smart devices for managing events, ordering items, and even streaming information. For example, users are now using smart devices to stream videos, movies, and the like. FIG. 1 illustrates an exemplary diagram of a user 106 involved in an interaction 100. In particular, FIG. 1 illustrates a user 106 participating in an interaction via a user device 102 in a communication and transaction with a smart device 104. The user device 102 and the smart device 104 can include any device including a tablet, iPad, cell phone, smartphone, laptop, desktop, vehicle, internet of things (IoT) device, merchant device or the like. For exemplary purposes, device 102 is a smartphone, and smart device 104 is an IoT device such as a television. The device 102 may be used for web browsing, video streaming, bill payments, money transfers, and online purchases. Additionally, the device 102 may be equipped with applications that enable the user to make purchases and transfers using payment provider applications and/or a digital wallet. Further, the device 102 may be capable of making phone calls and communicating with one or more other communications devices using a cellular network, Wi-Fi, Bluetooth, BLE, NFC, WLAN, etc. The communication can enable the transmission of information from a user account to a secondary source. In addition, the communication can enable the transmission of photographs, pictures, video, biometrics, and the like for user authentication. The communication can also enable to communication of transactional activity. For example, transactional activity includes the communication and streaming of information to and/or from a smart device 104. The smart device 104 can similarly be a smartphone, laptop, iPad, appliance, wearable, electronic, glasses, or the like that have the capacity to communicate with the user device 102.

Thus, as indicated, a user 106 is able to interact with one or both devices 102, 104 for transacting. At FIG. 1, an exemplary interaction is illustrated wherein the user 106 is interested in streaming on the smart device 104. As conventionally understood, the ability to stream on a smart device 104 (e.g., television) can entail multiple steps. These steps can include extensive user involvement and often begin with a manual input of a URL 108 provided by the smart device 104 on a user device 102. This URL 108 can include a unique code that a user may enter. Alternatively, the URL 108 can also be provided for user input with unique code input by text for user. In addition, there exists a submission of the unique hash from the smart device 104 and the need to download the provider application. Since new application and download is now available, registration and sign in is also needed. Then, because payment may be incurred with the stream, payment information and verification will further be needed.

Therefore, to simply stream a video on a smart device 104 various steps and processes are involved. In addition, a user may need a user account 110 with the streaming provider in order to permit and present the streaming options. Additionally, because accounts are being linked, and payments processed, a communication and connection occurs with the secondary device (user device 102). At the secondary user device 102, the user information, application login, and other relevant information may be input 112. Thus, for the user to be able to stream the video, the user device 102 and the smart device 104 should be in contact. In addition, as the streaming occurs payment and user information needs processing. Conventionally, the merchant or entity providing the streaming service may then need to communicate with a credit card or other financial service provider for processing the payment. This, thus, requires the merchant to manage the payment processing and then provide the confirmation for user verification of the charge and streaming selection. Unfortunately, such processing requisites can be quite complex and costly for the merchant. Further, the need to input across two devices can be cumbersome and time consuming to the user. As such, it would be beneficial to create a system and method for smart device communication and transaction that minimizes user and system friction.

Figure 2:
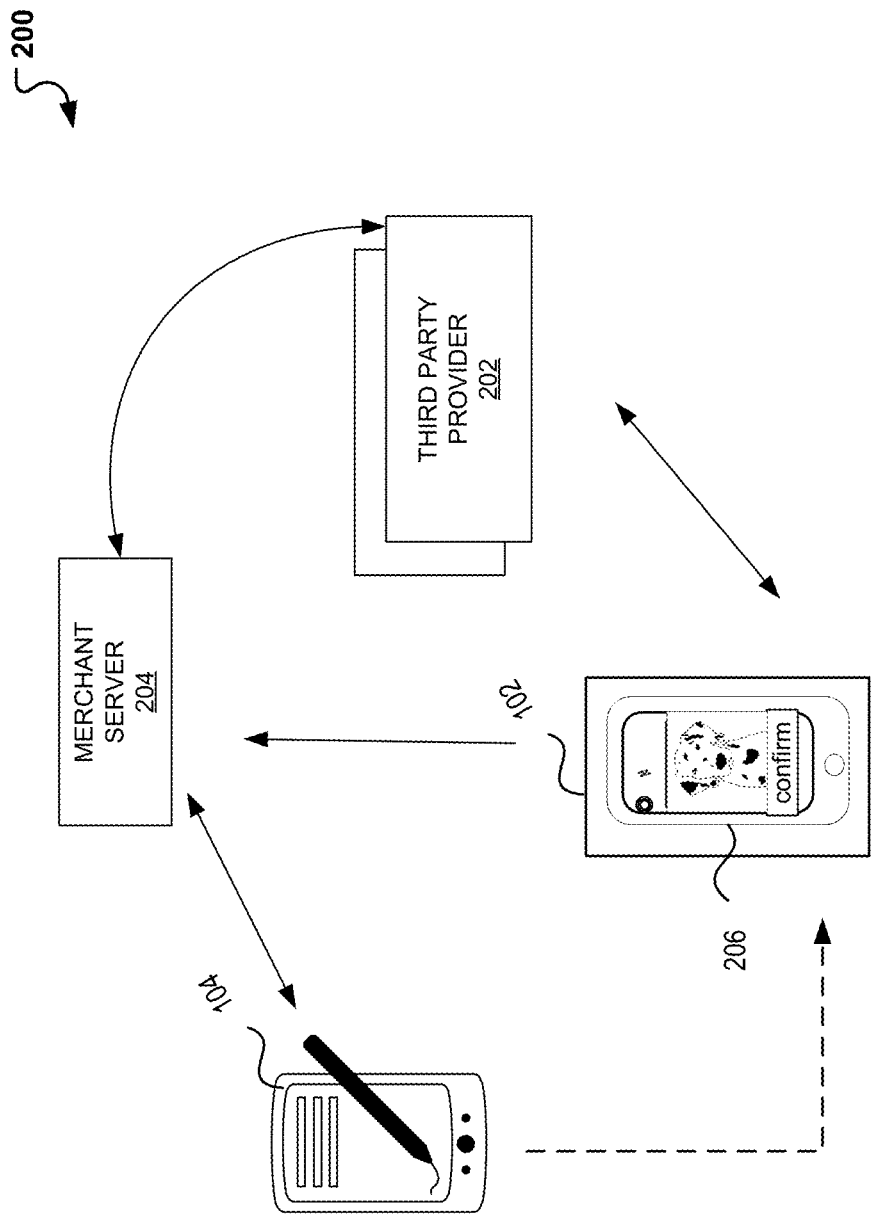
FIG. 2 illustrates exemplary network system used in conjunction with a smart device for transaction processing.

Accordingly, in one embodiment, a system and method are introduced which enables the communication and transaction with a smart device 104 via the introduction of a third-party service provider. Turning next to FIG. 2, an exemplary network system 200 is presented for use in conjunction with a smart device for transaction processing. As illustrated, in the current embodiment, the smart device 104 is again communicating with the user device 102 for performing the transaction. However, as previously indicated, oftentimes, an application associated with a merchant and corresponding merchant server 204 needs accessing and processing for the completion of the transaction. Herein, for the processing a third-party processor 202 is introduced. The third-party processor may be any entity with the ability to interface with various financial institutions (e.g., credit cards companies, banks, etc.) for the processing of a transaction. In other words, the third-party processor can be an entity (e.g., PayPal) available to facilitate the transaction processing.

Note that because the third-party processor is introduced, the merchant server 204, generally responsible for processing and/or communicating with the credit card processor is no longer involved in or need to perform such duty. Instead, in the current embodiment, the third-party provider facilitates the transaction. In addition, as illustrated the communication between the smart device 104 and the user device 102 becomes unidirectional wherein the user 106 of the user device 102 only needs to input a confirmation for the purchase.

For example, as illustrated in FIG. 2, the user 106 may be interested in streaming a movie about a dog, 206. In this example, the streaming may occur on smart device 104 which communicates with the merchant server (via an app, e.g., Netflix) about the desire to purchase. In the background, once the merchant server 204 is contacted, a communication occurs with the third-party provider 202 wherein the third-party provider 202 then can communicate with the credit card company or other financial institution for the processing of the transaction or movie request here. The third-party provider 202, once having processed the transaction can the further communicate with the user device 102 with a request to confirm the purchase and viewing of the movie 206. Confirmation of the movie 206 is received by the third-party provider 202 and the merchant server 204, which then allows the release of the movie for streaming on the smart device 104.

Note that in some embodiments, the merchant application would reside in the smart device 104. Also note, that the third-party provider 202 would then be coupled to and in communication with the merchant server 204 through the application. Thus, as the selection for a movie is received (or any other input indicating a desire to process a transaction), then the third-party payment provider 202 is able to facilitate the transaction without intervention from the merchant server 204. Accordingly, the third-party provider 202 provides the processing capability and eliminates the need for the merchant server 204 to participate in the processing, thus offloading the processing to the third-party service provider 202. Note that this type of transaction is also possible in other instances wherein the merchant communicates via a smart device 104 with the user device 102 and to a third-party provider 202. Accordingly, this smart device communication and processing is not limited to video streaming and can be included and used in other transactions.

To facilitate the communication, dynamic machine-readable codes may be introduced. In particular, in one embodiment, a dynamic machine-readable code 304 is presented at the smart device 104 for direct communication with the third-party provider 202. For example, turning next to FIG. 3, an exemplary communication and transaction processing 300 using a smart device 104 with a dynamic machine-readable code 304 is presented. As illustrated herein, again the use of a third-party payment provider 202 is introduced to eliminate the need for payment processing by the merchant in association with the transaction.

Thus, with reference to the previous streaming example, here again a smart device 104 is introduced for use in the projection of the video steam. A user device 102 interacts with the smart device 104 and allows the confirmation 302 of purchase and video stream on the display of the smart device 104. To facilitate the transaction and display of video, the third-party provider 202 with the use of a software development kit (SDK) or software framework 306 at the smart device 104 is able to generate the dynamic machine-readable code 304.

The dynamic machine-readable code 304 therefore links the smart device 104 to the third-party provider 202 through the use of the SDK 306A available at both the smart device 104 and as SDK 306B at the third-party provider 202. Accordingly, as the SDK 306A on the smart device 104 is generates the dynamic readable-code 304 that is read by the user device 102, a series of transactions occur. First, a communication begins at the third-party provider 202 signaling the payment processor 308 to begin the transaction processing and verification process. The user payment account associated with the merchant account is processed to ensure payment processing can occur. Once confirmed, the payment processor 308 communicates back with the third-party provider 202 signaling that is now acceptable to proceed with the request. Next, a communication also begins with the merchant application server 310 with a communication that there is a request to process the transaction (to stream a video) at the smart device 104. The communication can occur to signal that the third-party provider 202 has invoked the transaction and confirmation thereof. Thus, as the merchant application server 310 confirms, a handshake essentially occurs between the two entities ok'ing the transaction. Therefore, as the confirmation is received at the third-party provider 202 that the card processor 308 verification has been successfully satisfied, the merchant application server 310 can communicate via yet another SDK (not shown) with the smart device 104 to proceed. Consequently, the user device 102 prompts the user if the transaction may be processed (i.e., ok to pay at the user interface 152) and proceed with the transaction of linking 302 and thus streaming video on the smart device 104. Accordingly, friction and processing that was previously on the merchant application server 310 has been removed and offloaded to the third-party provider 202.

Now considering the user experience, a video to stream may be selected at the smart device 104. In response, a dynamic machine-readable code (e.g., QR code) 304 may be displayed at the smart device 104. Using the user device 102, the dynamic machine-readable code is read and then the user is asked to confirm the purchase and streaming of the video. Consequently, much like the merchant application server 310, friction is now removed from the user 106 as the need for logins, payment account information and further inputs are now replaced by a scan and confirmation input.

Note that although a streaming example is presented throughout the application and use of the dynamic machine-readable code 304 in conjunction with the third-party provider 202 is not so limited. Any other application with a smart device 102 which may be used to communicate directly with the user and/or in conjunction with a smart device 104 may also be used and applicable with this solution. Additionally, the use of such system is not limited to a wireless communication, online communications, long-range communications, and the like are also possible. Still further, also note that the description and components associated with the architecture described can include more or less components, servers, providers and the like.

Figure 3:
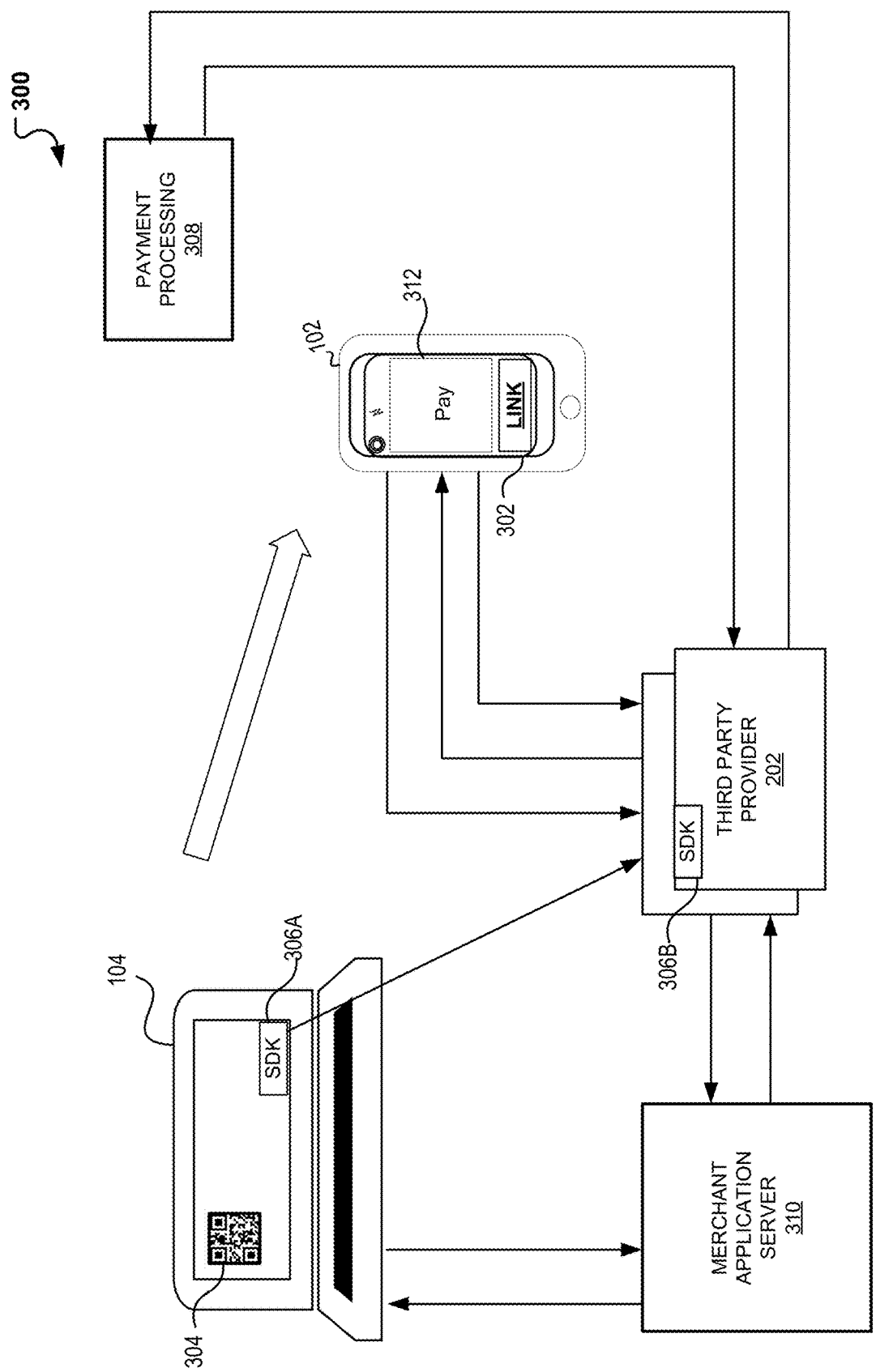
FIG. 3 illustrates an exemplary communication and transaction processing using a smart device.
Figure 4:
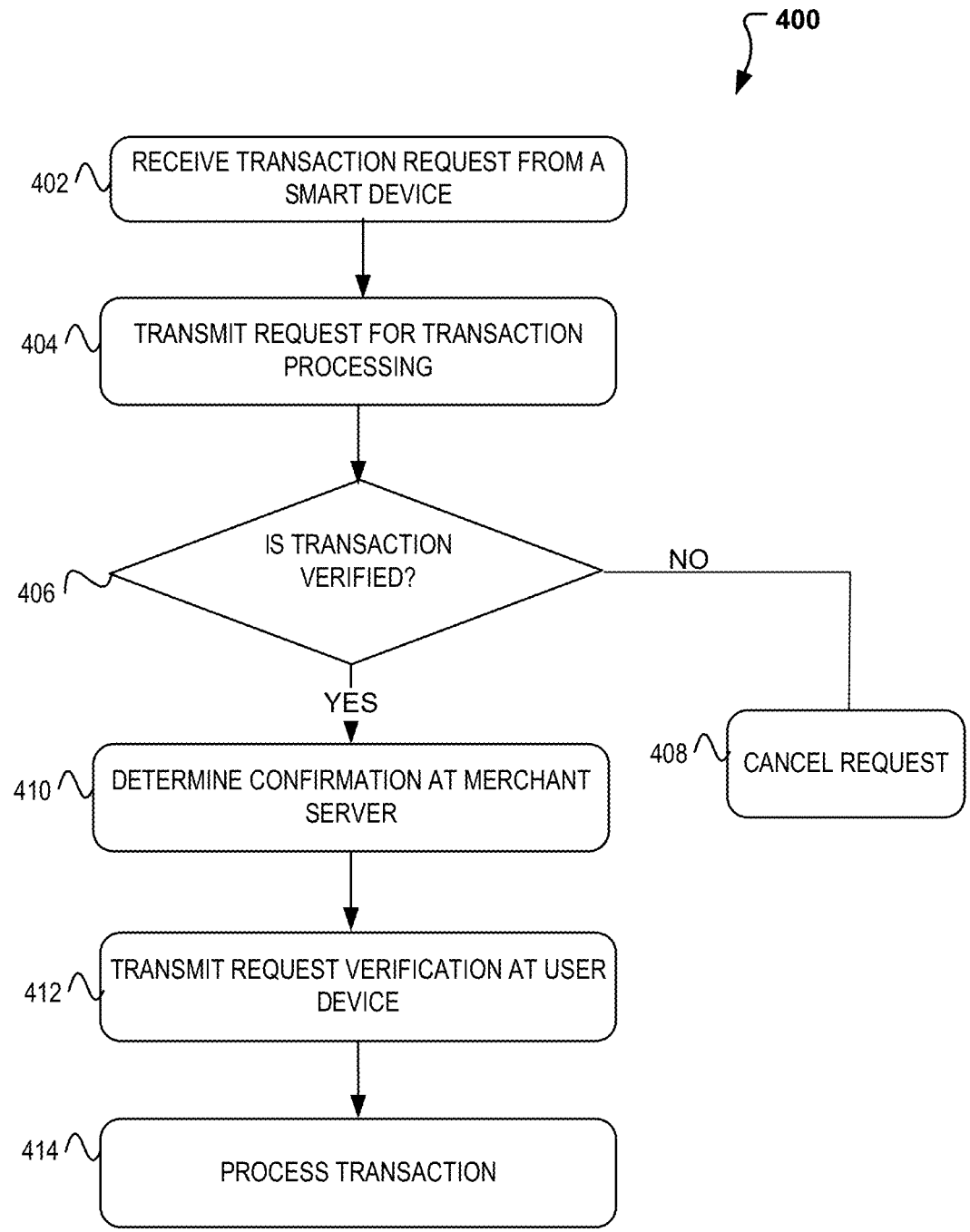
FIG. 4 illustrates a flow diagram illustrating operations for transaction processing and communication with a smart device.

Next, turning to FIG. 4, an example process 400 for processing a transaction and communication using a smart device as implemented on FIG. 3 is presented. In particular, FIG. 4 illustrates a flow diagram illustrating operations for processing using a dynamic machine-readable code with a third-party provider over a smart device.

Thus, in FIG. 4, according to some embodiments, process 400 may include one or more of operations 402-414, which may be implemented, at least in part, in the form of executable code stored on a non-transitory, tangible, machine readable media that, when run on one or more hardware processors, may cause a system to perform one or more of the operations 402-414.

Process 400 may begin with operation 402, where a request may be received at a third-party provider for the processing of a transaction on a smart device. The request may derive from the smart device through the scan of a dynamic machine-readable code generated by a software defined kit or framework associated with the third-party provider and with the use of a user device. In some embodiments, the transaction request can include a user account information (payment type, processor, account number, user name, device ID, etc.), transaction type (payment, streaming, refund, remittance, redirect, etc.), and smart device information.

Upon receipt of the scanned dynamic readable code, the third-party provider and system continue through to the processing operation 404. At operation 404, a communication may exist between the third-party provider and the credit card processor or other financial instrument/payment processor. The payment processor is associated with the third-party provider is designed to offload the need for a merchant or other entity to perform the processing operation. As operation 404 once the transaction is processed by payment processor, a determination is made at operation 406. If a determination is made that the payment may not be processed and/or verified, the process 500 continues to 408 where the transaction and request is cancelled. Alternatively, if at operation 406 it is determined that the payment may be processed and transaction request complete, then process 500 may continue to operation 410.

At operation 410, a communication and handshake occurs between the third-party provider and the merchant application server. During this operation, the merchant application server spools or listens for the third-party provider. Thus, as the merchant application server communicates with the third-party provider, an exchange of information is transmitted where the transaction type and confirmation of the request thereof is completed.

As confirmation of the request is communicated, at the user device and at operation 412, a user device is requested at the user interface. At the user interface, a request for user to confirm payment and transaction processing (e.g., confirm payment and streaming of video) is presented and a confirmation is received, process 500 continues to process the transaction at operation 500 wherein in the exemplary example, the video plays on the smart device.

Note that process 500 may include more or less operations. Operations 502-514 are for exemplary purposes and the order and number of operations may be modified. For example, updates, statuses, verifications may occur in parallel and in differing order. Additionally, additional processors, and servers may be involved including the payment processor and merchant server mentioned.

Figure 5:
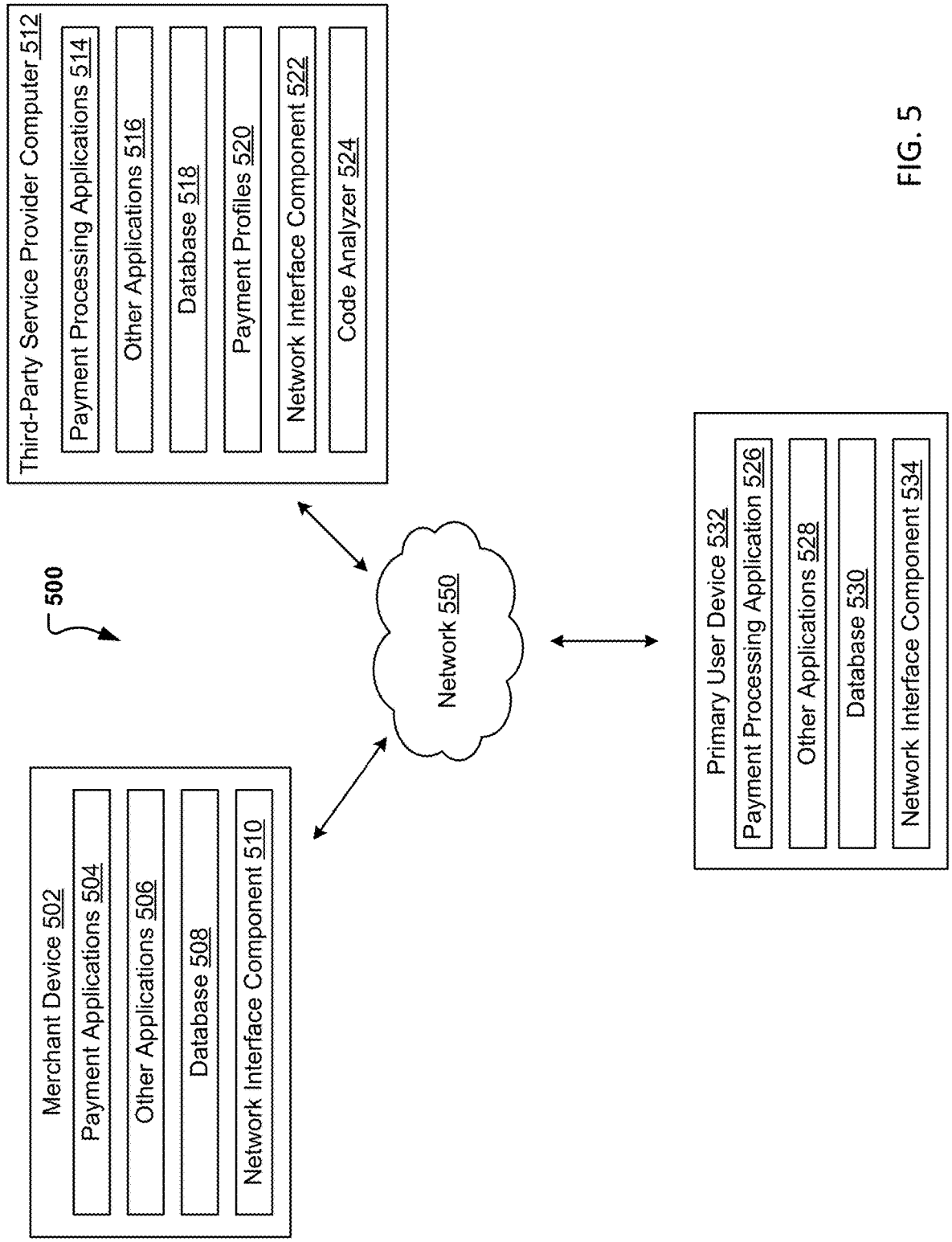
FIG. 5 illustrates a block diagram of a communication between systems used in conjunction with smart devices.

Turning next to FIG. 5, a block diagram of a networked system 500 for implementing the processes described herein is presented, according to an embodiment. In particular, FIG. 5 illustrates a block diagram of a system 500 for processing a transaction using a segmented platform. As shown, system 500 may include or implement a plurality of devices, computers, servers, and/or software components that operate to perform various methodologies in accordance with the described embodiments. It will be appreciated that the devices, computers, and/or servers illustrated in FIG. 5 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 500 includes a merchant/vendor device 502, a primary user device 532, a third-party service provider computer 512 in communication over a network 550. These devices 502, 532, and 512 are exemplary devices that may interact during the request to process a transaction.

The merchant device 502, primary user device 532, and the third-party service provider computer 512 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 500, and/or accessible over network 550.

The merchant device 502 may be implemented as a communication device that may utilize appropriate hardware and software configured for wired and/or wireless communication with the primary user device 532 and third-party service provider computer 512. For example, the merchant device 502 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, servers, and/or other types of computing devices capable of transmitting and/or receiving data. The merchant device 502 may correspond to and be utilized by a user, such as an employee of a merchant and/or another person authorized by the merchant, or independently as a stand-alone system.

The merchant device 502 may include one or more payment applications 504, other applications 506, a database 508, and a network interface component 510. The payment applications 504 and other applications 506 may correspond to executable processes, procedures, and/or applications with associated hardware. In other embodiments, merchant device 502 may include additional or different components having specialized hardware and/or software to perform operations associated with the payment applications 504 and/or the other applications 506.

The payment application 504 may facilitate financial transactions corresponding to the sale of goods and/or services offered by the merchant. For example, the payment application 504 may provide an interface for customers to purchase the goods or services and to receive customer payment information (e.g., customer credit card information). The payment application 504 may further transmit customer payment information to a payment processor (e.g., such as a payment processor corresponding to the third-party service provider computer 512) to process the customer payment information. The payment application 504 may also facilitate other types of financial transactions such as banking, online payments, money transfer, and/or the like.

The merchant device 502 may execute the other applications 506 to perform various other tasks and/or operations corresponding to the merchant device 502. For example, the other applications 506 may include security applications for implementing client-side security features, programmatic client applications for interfacing with appropriate application programming interfaces (APIs) over network 550, or other types of applications. In various embodiments, the other applications 506 may include social networking applications. Additionally, the other applications 506 may include device interfaces and other display components that may receive input and/or output information. For example, the other applications 506 may include a graphical user interface (GUI) configured to provide an interface to the user.

The merchant device 502 may further include a database 508, which may be stored in a memory and/or other storage device of the merchant device 502. The database 508 may include, for example, identifiers (IDs) such as operating system registry entries, cookies associated with the payment application 504 and/or other applications 506, IDs associated with hardware of the network interface component 510, IDs used for payment/user/device authentication or identification, and/or other appropriate IDs. The database 508 may also include information corresponding to one or purchase transactions of customers who have purchased goods or services from the merchant, browsing histories of the customers, or other types of customer information. In certain embodiments, the merchant device 502 may also include information and IDs corresponding to payments for tracking the transaction and operations associated with the transaction generated or with another user, a primary user device 532 and/or the third-party service provider computer 512.

The merchant device 502 may also include at least one network interface component 510 configured to communicate with various other devices such as the primary user device 532, and/or the third-party service provider computer 512. In various embodiments, network interface component 610 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 512 may be maintained, for example, by a third-party service provider, which may provide payment processing services for the merchant. In one example, the third-party service provider may be provided by PAYPAL™ Inc. of San Jose, CA, USA. Alternatively, the third-party service provider computer 512 may be associated with a user of the primary device 532. As such, the third-party service provider computer 512 includes one or more payment processing applications 514, which may be configured to process payment information received from the merchant device 502 or from a selection at the primary user device 532. In addition, the payment processing services can be tied to a processing system like device 102, 104 which can aid in transaction post-processing. For example, a payment application 504 of the merchant device 502 may receive payment information from a customer to purchase a service or good offered by the merchant. Upon receipt of the payment information, the payment application 504 may transmit the payment information to the third-party service provider computer 512. The payment processing application (or third-party payment application system) 514 of the third-party service provider computer 512 may receive and process the payment information.

The third-party service provider computer 512 may execute the other applications 516 to perform various other tasks and/or operations corresponding to the third-party service provider computer 512. For example, the other applications 516 may include security applications for implementing client-side security features, programmatic client applications for interfacing with appropriate APIs over the network 550, or other types of applications. The other applications 516 may also include additional communication applications, such as email, texting, voice, and IM applications that enable communication of emails, calls, texts, and other notifications through the network 550. In various embodiments, the other applications 516 may include location detection applications, such as a mapping, compass, and/or GPS applications, which may be used to determine a location of the third-party service provider computer 512. Additionally, the other applications 516 may include device interfaces and other display components that may receive input and/or output information. For example, the other applications 516 may include a GUI configured to provide an interface to one or more users.

The third-party service provider computer 512 may further include a database 518, which may be stored in a memory and/or other storage device of the third-party service provider computer 512. The database 518 may include, for example, IDs such as operating system registry entries, cookies associated with the payment processing application 514 and/or other the applications 516, IDs associated with hardware of the network interface component 522, IDs used for payment/user/device authentication or identification, transaction IDs, IDs for tracking transactions, (e.g., root payment IDs), and/or other appropriate IDs.

The payment information may include credit card information (e.g., encrypted card number, expiration date, security code, card issuer, and/or the like), Automated Clearing House (ACH) information (e.g., encrypted account number, routing number, and/or the like), identification information associated with the particular customer/user (e.g., a customer identifier, name, address, phone number, date of birth, and/or the like), billing information, credit score, and/or any other type of payment information associated with the particular customer. Furthermore, other payment profiles of the set of payment profiles 520 may include payment information corresponding to other customers of the merchant and/or other merchants associated with the user.

The third-party service provider computer 512 may also store a set of payment tokens corresponding to the set of payment profiles 520. For example, each payment profile of the set of payment profiles 520 may be associated with a corresponding payment token from the set of payment tokens. In some embodiments, each payment profile may include a corresponding payment token from the set of payment tokens. The set of payment tokens may be particular to the third-party service provider computer 512 (e.g., computers from other service providers may be unable to use the set of payment tokens) and may enable the merchant device 502 to more securely process payment transactions with the third-party service provider computer 512. For example, in order to process a payment transaction that involves a credit card number associated with a particular payment profile, the third-party service provider computer 512 may provide the merchant device 502 with a particular payment token that is different from the credit card number. The merchant device 502 may use the particular payment token to process the payment transaction instead of the credit card number. Further, the merchant device 502 may store and associate the particular payment token with the particular payment profile instead of the credit card number, thereby protecting the credit card number from being stolen in a potential security breach of the merchant device 502.

In various embodiments, the third-party service provider computer 512 also includes at least one network interface component 522 that is configured to communicate with the merchant device 502, the primary user device 532, and/or the secondary (smart) user device (not shown) via the network 550. The third-party provider computer 512, may also include a code analyzer 524 that may be used for communicating with smart device 204, merchant device 502, primary user device 532, etc. for determining the code (e.g., dynamic machine-readable code 304) and information received in the code. For example, user account information, smart device information, and transaction type may all be included in the dynamic machine-readable code.

The primary user device 532 may be implemented as a communication device that may utilize appropriate hardware and software configured for wired and/or wireless communication with the merchant device 502 and third-party service provider computer 512. The primary user device 532, may be a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. In one embodiment, the primary user device 532 may be mobile device communicating with wearable device (or secondary user device), merchant device 602, or directly with the third-party service provider system 512.

The primary user device 532 may include a payment processing application 526 that may be used as a digital wallet that can communicate with a merchant device 502, a secondary user device, and/or third-party service provider 512 for purchasing and transacting. The payment processing application 526, can work jointly with database 530 for retrieving bank account information, user accounts, security codes, identifiers, tokens, etc., that may be associated with various merchant locations, transactions, etc. Similarly, the payment processing application, can also provide access the user profiles for determining which payment method, processing code, to use at a merchant location. Still further, the payment processing application can provide access to other platforms available for processing the payments, remittance, and other transactions.

The primary user device 532 may also include other applications 528 to perform various other tasks and/or operations corresponding to the primary user device 532. For example, the other applications 528 may facilitate communication with the merchant device 502, such as to receive an indication, from the merchant device 502, to switch payment processing services from the third-party service provider to the service provider. As another example, the other applications 528 may include security applications, application that enable designation of a primary interactive device, and applications that allow for web site searches (including access to merchant websites). The other applications 528 may also include additional communication applications, such as email, texting, voice, and IM applications that enable communication of emails, calls, texts, and other notifications through the network 550. In various embodiments, the other applications 528 may include location detection applications, such as a mapping, compass, and/or GPS applications, which may be used to determine a location of the primary user device 532. The other applications 528 may include social networking applications. Additionally, the other applications 528 may include device interfaces and other display components that may receive input and/or output information. For example, the other applications 528 may include a GUI configured to provide an interface to one or more users.

The primary user device 532 may further include a database 530, which may be stored in a memory and/or other storage device of the primary user device 532. The database 630 may include, for example, identifiers (IDs) such as operating system registry entries, cookies associated with a web browser and/or the other applications 528, IDs associated with hardware of the network interface component 534, IDs used for payment/user/device authentication or identification, bank information, merchant information, user accounts, and/or other appropriate IDs.

The primary user device 532 may also include at least one network interface component 534 configured to communicate with various other devices such as the merchant device 502 and/or the third-party service provider computer 512.

Note that although a primary user device 532, a third-party service provider computer 512, and merchant device 502 are illustrated, a credit card provider may also be included and used in communication with the third-party service provider computer 512 and/or merchant device 502 for performing an electronic transaction. Additionally, or alternatively, the merchant may be accessed digitally through a network over a computer website on the primary user device 532 and the merchant device may instead be the credit card provider used for processing the electronic transaction.

Figure 6:
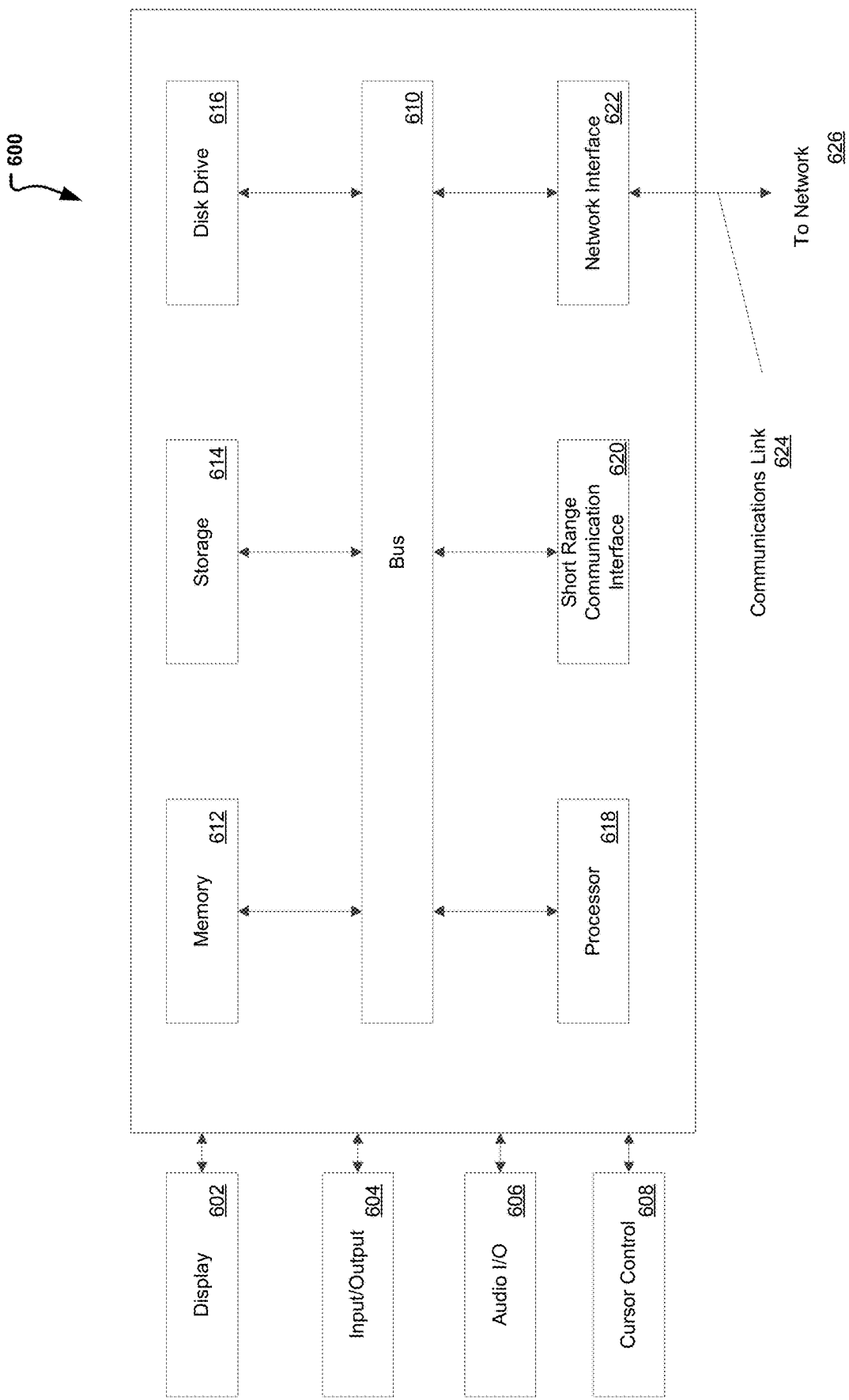
FIG. 6 illustrates an example block diagram of a computer system suitable for implementing one or more devices of the communication systems of FIGS. 1-6.

FIG. 6 illustrates an example computer system 600 in block diagram format suitable for implementing on one or more transactions and allocations as described above and in conjunction with FIGS. 1-6. In various implementations, a device that includes computer system 600 may comprise a computing device (e.g., a smart or mobile device, a computing tablet, a personal computer, laptop, wearable device, PDA, server, etc.) that is capable of communicating with a network 626. A service provider and/or a content provider may utilize a network computing device (e.g., a network server or third-party service provider computer 512) capable of communicating with the network 626. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 may include an image sensor for capturing images and/or video, such as a complementary metal oxide semiconductor (CMOS) image sensor, and/or the like. An audio input/output component 606 may also be included to allow a user to use voice for inputting information by converting audio signals. Audio I/O component 606 may allow the user to hear audio. A transceiver or network interface 622 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612. Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short-range communications interface 620. Short range communications interface 620, in various embodiments, may include transceiver circuitry, an antenna, and/or waveguide. Short range communications interface 620 may use one or more short-range wireless communication technologies, protocols, and/or standards (e.g., Wi-Fi, Bluetooth®, Bluetooth Low Energy (BLE), infrared, NFC, etc.).

Short range communications interface 620, in various embodiments, may be configured to detect other devices (e.g., primary user device 532, merchant device 502, etc.) with short range communications technology near computer system 600. Short-range communications interface 620 may create a communication area for detecting other devices with short range communication capabilities. When other devices with short range communications capabilities are placed in the communication area of short-range communications interface 620, short range communications interface 620 may detect the other devices and exchange data with the other devices. Short-range communications interface 620 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short-range communications protocol, such as Wi-Fi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, Wi-Fi, LTE, 5G, and/or various other wired or wireless networks, including telecommunications, mobile, and cellular phone networks) may perform instruction sequences to practice the present disclosure in coordination with one another. Components described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants/vendors and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions; and
one or more hardware processors configured to execute the instructions to cause the system to perform operations comprising:
in response to receiving a transaction request for streaming content on a smart device, causing, via a first software framework of the smart device, the smart device to encode transaction information that identifies the content associated with the transaction request and a device identifier that identifies the smart device into a machine-readable code;
causing, via the first software framework, the smart device to present the machine-readable code on a display of the smart device;
receiving, by a service provider server from a user device over a communication network, a representation of the machine-readable code that is presented on the smart device and captured by the user device;
analyzing, by the service provider server, the representation of the machine-readable code;
extracting, by the service provider server, the transaction information and the device identifier from the representation of the machine-readable code based on the analyzing;
communicating, by the service provider server over a payment network, the transaction information with a payment processor for verifying the transaction request;
presenting, on the user device, a confirmation request based on a response received from the payment processor indicating that the transaction request is verified;
in response to receiving a confirmation signal from the user device, processing a payment associated with the transaction request based on the response received from the payment processor;
receiving a payment authorization signal from the payment processor; and
in response to receiving the payment authorization signal from the payment processor, transmitting, by the service provider server and to a merchant application server, data comprising the transaction information and the device identifier extracted from the representation of the machine-readable code, wherein the transmitting the data enables the merchant application server to stream the content to the smart device via a second software framework of the smart device based on the transaction information and the device identifier.

2. The system of claim 1, wherein the operations further comprise:
receiving the transaction request from the smart device.

3. The system of claim 1, wherein the transaction information comprises a transaction type associated with the transaction.

4. The system of claim 1, wherein the transaction information encoded into the machine-readable code comprises an identifier corresponding to the content, and wherein the data transmitted to the merchant application server further comprises the identifier.

5. The system of claim 1, wherein the service provider server is configured to communicate with the smart device via the first software framework.

6. The system of claim 1, wherein the transaction request further comprises request information indicating a transaction request type associated with the transaction request and user information.

7. A method, comprising:
in response to receiving a request from a smart device to process a transaction associated with providing content on the smart device, causing, via a first software framework executed on the smart device, the smart device to encode transaction information that identifies the content associated with the transaction and device information that identifies the smart device into a machine-readable code;

causing, via the first software framework, the smart device to present the machine-readable code on a display of the smart device to be captured by the user device;

subsequent to causing the smart device to present the machine-readable code, receiving, by a service provider server and from a user device associated with an account, a representation of the machine-readable code that is presented on the smart device;

extracting, by the service provider server, the transaction information and the device information from the representation of the machine-readable code;

communicating, by the service provider server, the transaction information with a payment processor system for verifying the transaction request;

presenting, on the user device, a confirmation request based on a response received from the payment processor system indicating that the transaction request is verified;

in response to receiving a confirmation signal from the user device, processing, by the service provider server, a payment associated with the transaction through a user account with the payment processor system based on the transaction information extracted from the representation of the machine-readable code; and subsequent to receiving a payment authorization signal from the payment processor system, transmitting, by the service provider server, instructions to a merchant application server, wherein the instructions comprise the transaction information and the device information extracted from the representation of the machine-readable code, and wherein the transmitting the instructions causes the merchant application server to begin providing the content on the smart device via a second software framework executed on the smart device based on the transaction information and the device information.

8. The method of claim 7, wherein the service provider server communicates with the payment processor system via a payment network.

9. The method of claim 7, further comprising:
receiving the request via the first software framework of the smart device.

10. The method of claim 7, wherein the service provider server is configured to interface with the payment processor system and the merchant application server.

11. The method of claim 7, further comprising:
analyzing the representation of the machine-readable code, wherein the transaction information and the device information are extracted based on the analyzing.

12. The method of claim 11, wherein the transaction information further comprises a transaction type associated with the transaction.

13. The method of claim 7, wherein the transaction information encoded into the machine-readable code comprises an identifier corresponding to the content, and wherein the instructions transmitted to the merchant application server further comprises the identifier.

14. The method of claim 7, wherein the payment is processed further based on the device information extracted from the representation of the machine-readable code.

15. A non-transitory machine-readable medium having instructions stored thereon, the instructions executable to cause a machine associated with a service provider to perform operations comprising:

in response to receiving a request from a smart device to process a transaction associated with providing content on the smart device, causing, via a first software framework executed on the smart device, the smart device to encode transaction information that identifies the content and device information that identifies the smart device into a machine-readable code;

causing, via the first software framework executed on the smart device, the smart device to present the machine-readable code on a display of the smart device for capture by the user device;

subsequent to causing the smart device to present the machine-readable code, receiving, from a user device associated with a user account, a representation of the machine-readable code that is presented on the smart device;

extracting, from the representation of the machine-readable code, the transaction information and the device information;

communicating, over a payment network, the transaction information with a payment processor system for verifying the transaction request;

presenting, on the user device, a confirmation request based on a response received from the payment processor system indicating that the transaction request is verified;

in response to receiving a confirmation signal from the user device, processing a payment associated with the transaction through the user account with the payment processor system based on the transaction information; and in response to receiving a payment authorization signal from the payment processor system, transmitting, to a merchant application server, data comprising the transaction information and the device information extracted from the representation of the machine-readable code, wherein the transmitting the data causes the merchant application server to begin providing the content on the smart device via a second software framework executed on the smart device based on the transaction information and the device information.

16. Non-transitory machine-readable medium of claim 15, wherein the operations further comprise:
receiving the request via the first software framework executed on the smart device.

17. The non-transitory machine-readable medium of claim 15, wherein the service provider server is configured to interface with the payment processor system and the merchant application server.

18. The non-transitory machine-readable medium of claim 15, wherein the operations further comprise:
analyzing the representation of the machine-readable code, wherein the transaction information and the device information are extracted based on the analyzing.

19. The non-transitory machine-readable medium of claim 18, wherein the transaction information further comprises a transaction type associated with the transaction.

20. The non-transitory machine-readable medium of claim 15, wherein the transaction information encoded into the machine-readable code comprises an identifier corresponding to the content, and wherein the data transmitted to the merchant application server further comprises the identifier.

* * * * *